United States Patent
Woehler et al.

(10) Patent No.: US 7,243,092 B2
(45) Date of Patent: Jul. 10, 2007

(54) TAXONOMY GENERATION FOR ELECTRONIC DOCUMENTS

(75) Inventors: Johannes Woehler, Salem (DE); Franz Faerber, Walldorf (DE)

(73) Assignee: SAP AG, Walldorf (DE)

(*) Notice: Subject to any disclaimer, the term of this patent is extended or adjusted under 35 U.S.C. 154(b) by 655 days.

(21) Appl. No.: 10/233,019

(22) Filed: Aug. 29, 2002

(65) Prior Publication Data

US 2003/0126561 A1 Jul. 3, 2003

Related U.S. Application Data

(60) Provisional application No. 60/346,446, filed on Dec. 28, 2001.

(51) Int. Cl.
*G06F 17/30* (2006.01)
(52) U.S. Cl. .................................. 707/3; 707/2; 707/10
(58) Field of Classification Search .............. 707/1–10, 707/104.1, 200–205; 704/9
See application file for complete search history.

(56) References Cited

U.S. PATENT DOCUMENTS

| | | | |
|---|---|---|---|
| 6,253,202 B1* | 6/2001 | Gilmour | 707/9 |
| 6,360,227 B1* | 3/2002 | Aggarwal et al. | 707/102 |
| 6,438,543 B1* | 8/2002 | Kazi et al. | 707/5 |
| 6,442,545 B1* | 8/2002 | Feldman et al. | 707/6 |
| 6,446,061 B1* | 9/2002 | Doerre et al. | 707/3 |
| 6,523,026 B1* | 2/2003 | Gillis | 707/3 |
| 6,594,658 B2* | 7/2003 | Woods | 707/5 |
| 6,640,224 B1* | 10/2003 | Chakrabarti | 707/5 |
| 6,665,681 B1* | 12/2003 | Vogel | 707/101 |
| 6,701,311 B2* | 3/2004 | Biebesheimer et al. | 707/5 |
| 6,704,729 B1* | 3/2004 | Klein et al. | 707/5 |
| 6,732,090 B2* | 5/2004 | Shanahan et al. | 707/3 |
| 6,772,170 B2* | 8/2004 | Pennock et al. | 707/102 |
| 6,901,398 B1* | 5/2005 | Horvitz et al. | 707/5 |
| 6,910,037 B2* | 6/2005 | Gutta et al. | 707/5 |
| 6,941,297 B2* | 9/2005 | Carmel et al. | 707/3 |
| 7,003,442 B1* | 2/2006 | Tsuda | 704/9 |
| 7,003,516 B2* | 2/2006 | Dehlinger et al. | 707/5 |
| 2001/0013029 A1* | 8/2001 | Gilmour | 707/1 |
| 2003/0014405 A1* | 1/2003 | Shapiro et al. | 707/5 |
| 2003/0033300 A1* | 2/2003 | Bergman et al. | 707/5 |
| 2003/0078913 A1* | 4/2003 | McGreevy | 707/3 |
| 2003/0093423 A1* | 5/2003 | Larason et al. | 707/5 |
| 2004/0148155 A1* | 7/2004 | Vogel | 704/9 |

(Continued)

OTHER PUBLICATIONS

Feldman et al, Text Mining at the Term Level, pp. 65-73 Year of Publication: 1998 ISBN: 3-540-650687.*

(Continued)

*Primary Examiner*—John E. Breene
*Assistant Examiner*—Baoquoc N. To
(74) *Attorney, Agent, or Firm*—Mintz, Levin, Cohn, Ferris, Glovsky & Popeo, P.C.

(57) ABSTRACT

Systems and techniques to generate a term taxonomy for a collection of documents and filling the taxonomy with documents from the collection. In general, in one implementation, the technique includes: extracting terms from a plurality of documents; generating term pairs from the terms; ranking terms in each term pair based on a relative specificity of the terms; aggregating the ranks of the terms in each term pair; selecting term pairs based on the aggregate rankings; and generating a term hierarchy from the selected term pairs.

25 Claims, 5 Drawing Sheets

U.S. PATENT DOCUMENTS

2004/0230577 A1* 11/2004 Kawatani .................. 707/6
2005/0097628 A1* 5/2005 Lussier et al. .............. 800/260

OTHER PUBLICATIONS

Fabrizio Sebastiani. Machine learning in automated text categorization, ACM Press, vol. 34, Issue 1, Mar. 2002, pp. 1-47.*

Chuang et al. Taxonomy generation for text segments: A practical web-based approach, ACM Press, vol. 23, Issue 4, Oct. 2005, pp. 363-396.*

Chan et al. Efficient filtering of XML documents with Xpath expressions, vol. 11, Issue 4, 2002, pp. 354-379.*

Caraballo, Sharon A. Automatic Construction of a Hypernym-Labeled Noun Hierarchy from Text, Ph.D. Thesis, Brown University, May, 2001, Providence, Rhode Island (USA). Retrieved from the internet: URL:http://www.cs.georgeotwn.edu/{caraball/CaraballoThesis.ps, retrieved on Feb. 18, 2004.

Sanderson, et al. "Deriving concept hierarchies from text", *Proceedings of SIGIR '99, 22nd International Conference on Research and Development in Information Retrieval*, Berkeley, California, (USA), Aug. 1999, Annual International ACM-SIGIR Conference on Research and Development in Information Retrieval, New York, NY, Aug. 1999, pp. 206-213.

Dunning, Mark. "Accurate Methods for the Statistics of Surprise and Coincidence", *Computational Linguistics*, 19.1 (Mar. 1993), pp. 61-74.

Rigau, German, et al., "Combining Unsupervised Lexical Knowledge Methods for Word Sense Disambiguation", *Proceedings of the 35th Annual Meeting of the Association for Computational Linguistics and 8th Conference of the European Chapter of the Association for Computational Linguistics, Madrid, Spain*, Jul. 7-12, 1997, pp. 48-55.

Roark, Brian, et al., "Noun-phrase co-occurrence statistics for semi-automatic semantic lexicon construction", *Proceedings of the Annual Meeting of the Association for Computational Linguistics and 17th International Conference on Computational Linguistics*, Aug. 1998, vol. 1, pp. 1110-1116.

Hearts, Marti A., "Automatic Acquisition of Hyponyms from Large Text Corpora", *Proceedings of the Fourteenth International Conference on Computational Linguistics*, Nantes, France, Jul. 1992, pp. 539-545, Retrieved from the internet URL:http://citeseer.nj.nec.com/hearts92automatic.html, retrieved on Feb. 5, 2004.

Miller, et al., "Introduction to WordNet: An On-Line Lexical Database", *International Journal of Lexicography*, vol. 3, No. 4, pp. 235-244, 1990.

Ted Dunning, *Accurate Methods for the Statistics of Surprise and Coincidence*, 19 Association for Computational Linguistics, 61-74 (1993).

Brian Roark, et al., *Noun-phrase co-occurrence statistics for semi-automatic semantic lexicon construction*, Proceeding of the Annual Meeting Of The Association For Computational Linguistics and 17th International Conference on Computational Linguistics (Oct. 8, 1998), 2, 1110-1116.

Sharon A. Caraballo, *Automatic Acquisition of a Hypernym-Labeled Noun Hierarchy from Text*, PhD Thesis (May 2001), Brown University, Providence, USA.

Jinxi Xu and W. Bruce Croft. *Improving the Effectiveness of Information Retrieval with Local Context Analysis*, Computer Science Department. University of Massachusetts.

O.R. Zainae et al., "On-Line Resource Discovery Using Natural Language" in Proceedings of RIAO'97, Montreal, Canada, Jun. 25-27, 1997.

\* cited by examiner

TAXONOMY GENERATION FOR ELECTRONIC DOCUMENTS

CROSS REFERENCE TO RELATED APPLICATIONS

This application claims the benefit of the priority of U.S. Provisional Application Ser. No. 60/346,446, filed Dec. 28, 2001 and entitled "TAXONOMY GENERATION".

BACKGROUND

The present application describes systems and techniques relating to information retrieval (IR) techniques, for example, taxonomy generation for a document structure.

Searching information in a large collection of documents is often time-consuming. To increase the speed of the search, the document collection may be organized in a structural way, e.g., in clusters where documents of similar topics are stored together. Taxonomy generation deals with categorizing and labeling documents to satisfy a user's need for efficient document searching and retrieval.

A common approach to categorizing documents uses clustering algorithms, which group documents with similar types of contents in a cluster. After the clustering operation, a label is given to each cluster to describe the type of documents in the cluster. The ability of a user to navigate the document structure may depend on the descriptiveness of the labels. However, descriptive labels may be hard to find, if not impossible. Moreover, some of the clusters may be related to one another, and the cluster labels typically do not reflect such a relationship.

SUMMARY

The present application teaches generating a large number of meaningful terms from a document collection, creating a taxonomy from these terms, and filling the taxonomy with documents from the collection.

In one aspect, terms are extracted from a collection of documents and ranked based on relevance. The terms may be ranked using multiple independent algorithms, the results of which are aggregated. Terms are selected based on relevance, and the selected terms are paired into term pairs. The term pairs may be pre-selected by determining a similarity between the terms in each term pairs. The terms in each term pair may be ranked based on the relative specificity of the terms. The terms may be ranked using multiple independent algorithms, the results of which are aggregated. Term pairs are selected based on the aggregate rankings and used to generate a term hierarchy. The term hierarchy may be optimized and filled with documents from the collection.

The systems and techniques described here may result in one or more of the following advantages. The taxonomy generator creates the term hierarchy before assigning the documents. As a result, the labels to the nodes of the term hierarchy are generally descriptive, informative, and allow for intuitive navigation. Furthermore, the taxonomy generator may choose appropriate algorithms for generating the term hierarchy based on the type of document collection. The taxonomy generator may further compare and combine different algorithms to take advantage of the strength of each algorithm.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
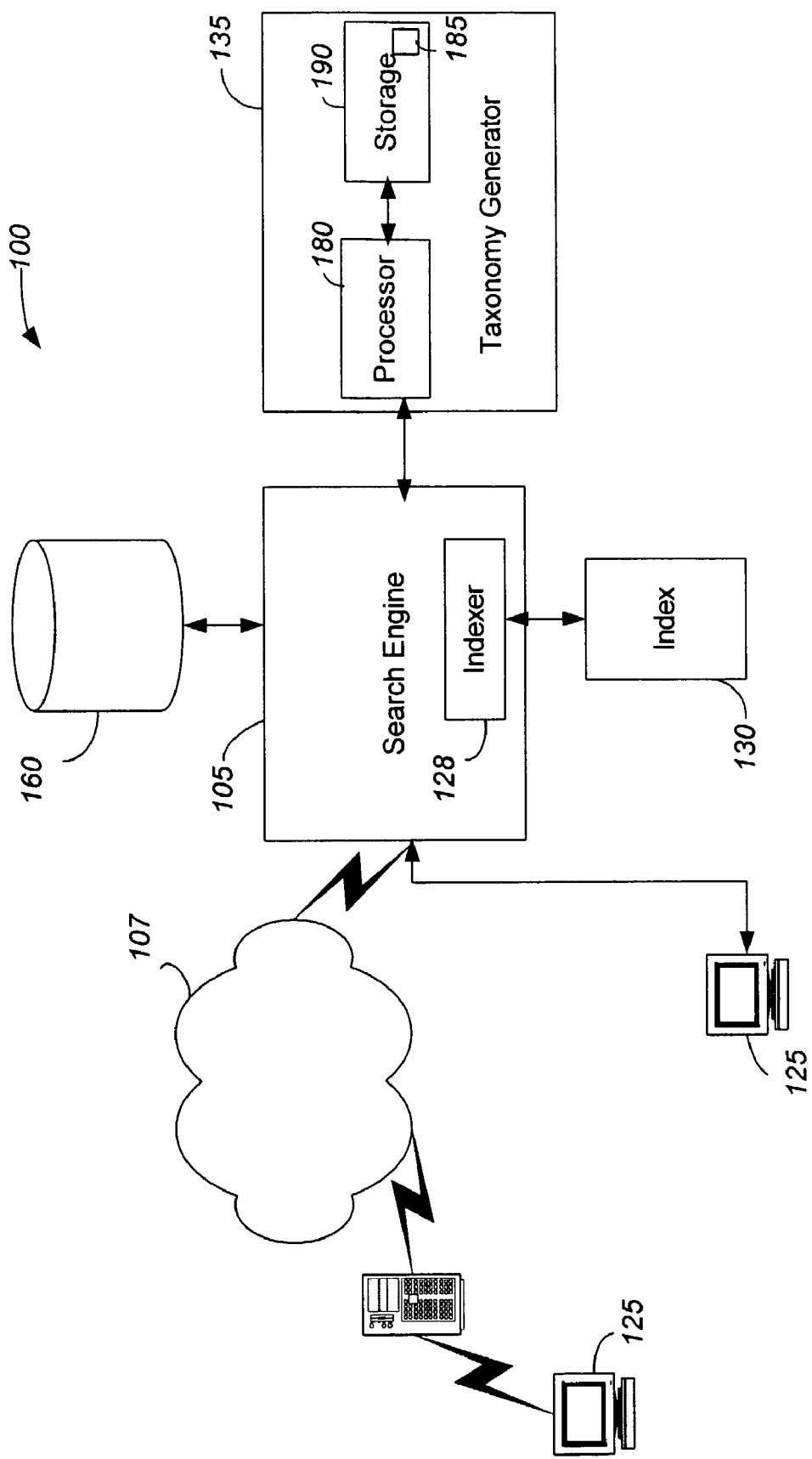
FIG. 1 illustrates an information retrieval system that uses a taxonomy generator to classify documents.

FIG. 1 illustrates an information retrieval system 100. The system 100 includes a search engine 105 to search a source 160 of documents, e.g., one or more servers or databases, for documents relevant to a user's query. An indexer 128 reads documents fetched by the search engine 105 to create an index 130 based on the words contained in each document. The index 130 may contain all the terms in the fetched documents and the corresponding frequency of occurrences of each term. The user can access the search engine 105 using a client computer 125 via a communication link, e.g., a direct connection or a connection through a network 107.

The user sends a query to the search engine 105 to initiate a search. A query is typically a string of words that characterizes the information that the user seeks. The query includes text in, or related to, the documents that user is trying to retrieve. The query may also contain logical operators, such as Boolean and proximity operators. The search engine 105 uses the query to search the documents in the source 160, or the index 130 of these documents, for documents responsive to the query.

Depending on the search criteria and number of documents in the source 160, the search engine 105 may return a very large collection of documents for a given search. The search engine 105 may also return a document abstract in the retrieval result to facilitate a further search. In one scenario, the system 100 uses a taxonomy generator 135 to organize the retrieval results into a hierarchy of documents. The taxonomy generator 135 may be, for example, a software program 185 stored on a storage device 190 and run by the search engine 105 or by a programmable processor 180.

Figure 2:
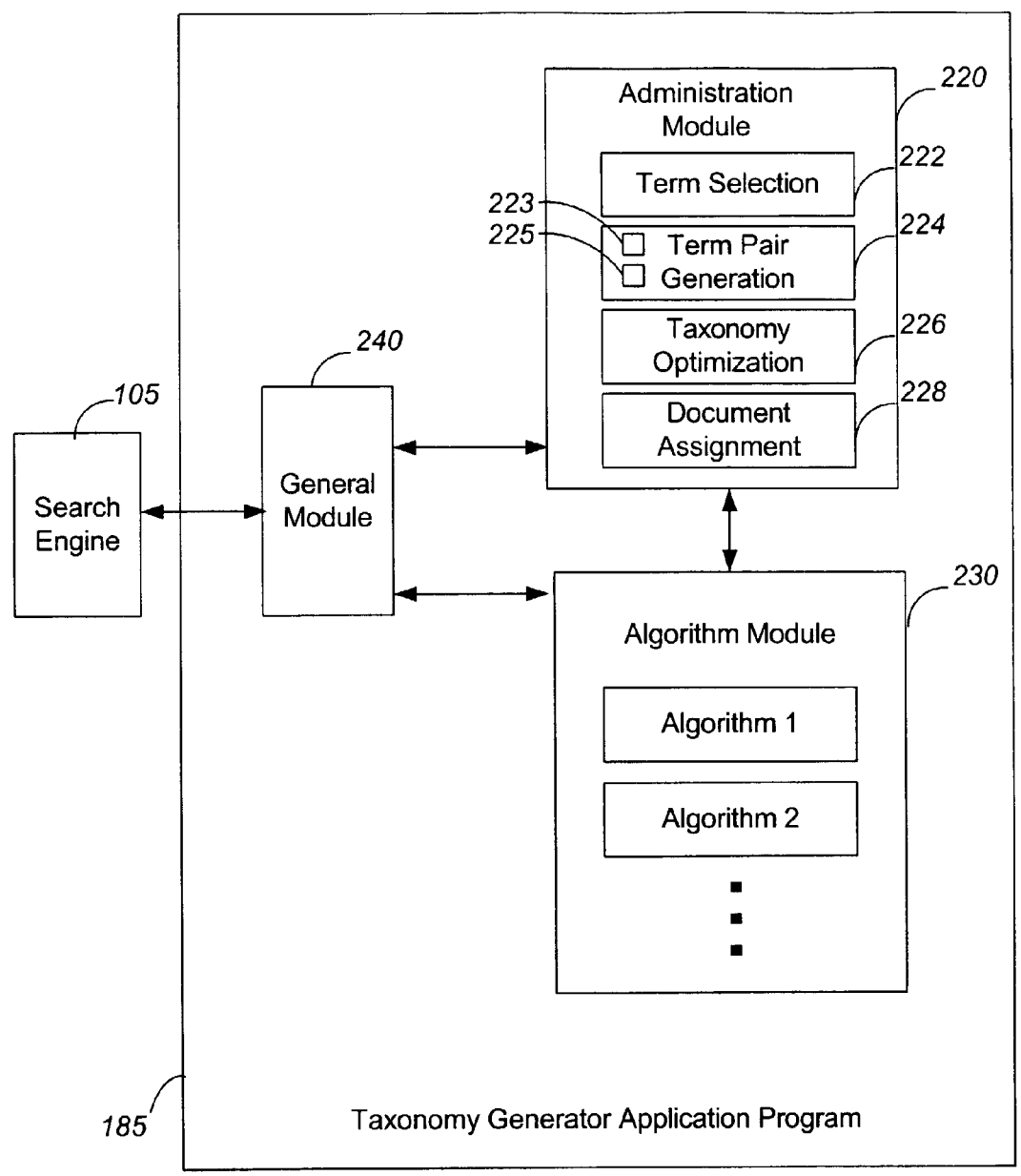
FIG. 2 illustrates exemplary software modules of a taxonomy generator application program.

FIG. 2 illustrates software modules of a taxonomy generator application program 185. The program 185 uses a general module 140 to perform file I/O functions and to communicate with the search engine 105 and other modules. An administration module 220, including a plurality of functional modules, performs the tasks of creating a term hierarchy and document assignment. The functional modules include a term selection module 222 to select and extract terms from the index 130, and a term pair generation module 224 to generate term pairs from the extracted terms and to create a term hierarchy from the term pairs. After the term hierarchy is created, a taxonomy optimization module 226 performs optimization on the term hierarchy. A document assignment module 228 then assigns the documents to the nodes of the term hierarchy.

The administration module 220 may perform these tasks using a number of independent algorithms in an algorithm module 230.

The term selection module 222 may use an algorithm that measures a document frequency (DF), which counts the number of documents containing a given term. The DF algorithm specifies that a term is not selected if the DF is either below a low threshold (e.g., DF<10) or above a high threshold (e.g., DF>half of the documents in the index 130).

The term selection module 222 may also use algorithms that assess the selectability of a term based on different criteria. These algorithms may include, but are not limited to, standard frequency algorithms, a TFIDF (Text Frequency and Inverse Document Frequency) algorithm, and a corpus-based term extractor.

The TFIDF algorithm weighs terms to dampen the influence of the trivial text. The frequency of a term may be multiplied by the weight, log(N/n), where N is the number of documents in collection and n is the number of documents where the term occurs at least once.

The corpus-based term extractor uses a relevance criterion to rank the terms. The relevance criterion is a function of term frequencies in the common corpus and the domain corpus, where the common corpus is a common collection of documents from different domains (e.g. the Google® Directory) and the domain corpus is the document collection being organized (e.g., the domain relevant to the user's query). The relevance criterion may be defined as follows:

$$Relevance(t)=1-1/\log 2(2+Ft,dc*Dt,dc/Ft,gc),$$

where $Ft,dc$=relative frequency of term t in domain corpus dc;
$Ft,gc$=relative frequency of term t in common corpus gc; and
$Dt,dc$=relative number of documents in dc, in which term t occurs.

The relevance criterion generally provides an indication of how often a term occurs in the domain corpus. Terms that seldom occur in the domain corpus have a lower relevance. Terms that occur more often have a higher relevance, except when these terms only occur in very few documents in the domain corpus.

Each algorithm in the first subset generates a result that indicates whether a term may be selected. The results may be aggregated together to produce a first aggregate ranking. In an exemplary aggregate ranking operation, each term is given a rank value of zero. If the result of an algorithm indicates that a term may be selected, the rank value of the term is incremented by one. On the other hand, if the result of an algorithm indicates that a term may not be selected, the rank value of the term is decremented by one. If the algorithm does not generate a definite result either way, the rank value remains the same. The first aggregate ranking is the final rank value after incorporating the results from all of the algorithms in the first subset. If the first aggregate ranking of a term is above a pre-determined threshold, the term is selected.

The selected terms are processed by the term pair generation module 224 to produce term pairs. A term pair may be formed by pairing every selected term with every other selected term. However, the term pair created in this manner may contain terms that are not related to each other, and therefore may not be suitable for a term hierarchy. To cut down the number of term pairs that contain unrelated terms, the term pair generation module 224 may use a term pair pre-selection unit 223 and a term pair evaluation unit 225 to select a term pair and to evaluate the suitability of the term pair, respectively.

The term pair pre-selection unit 223 may identify the terms that are similar to each other by generating a vector formed by the frequencies of the terms in a given term pair for each document. The angle between the vectors indicates the similarity of the terms in the term pair. For example, if two terms always occur together in all of the documents, the vectors corresponding to the two terms are all parallel to each other and therefore have an angle of zero degree between any two of the vectors. In this case, these two terms may be considered similar. Generally, a small angle between the vectors indicates a high degree of similarity. The pair pre-selection unit 223 may set a maximum threshold on the angles, or a minimal threshold on the cosine of the angles, to identify similar terms.

After the term pairs are selected, the term pair evaluation unit 225 evaluates the relative generality or specificity of the terms in the term pairs. The evaluation may be performed by using a number of the hypothesis testers in the second subset of the algorithm module 230. Each of the hypothesis testers may independently generate a pair of rank values for each term pair to indicate the relative specificity of the terms. Each of the rank values indicates the relative specificity of a term pair in one of the two directions: from right to left or from left to right.

One of the hypothesis testers may use a concept hierarchy method that determines the relationship between a term x and a term y based on the document sets in which x and y occur. If the document set in which y occurs is a subset of the document set in which term x occurs, then term y is a child of term x. This parent-child relationship may be established when the conditional probability of $P(x|y)$ and $P(y|x)$ satisfy the following conditions:

$$P(x|y)>=0.8 \text{ and } P(y|x)<1.$$

The term pair evaluation unit 225 may use another hypothesis tester which is a combination of two methods: a frequency-based method and a modifier method. The hypothesis tester determines the relative specificity of the terms in a term pair based on the assessment of both of the methods. The relative specificity is left undetermined if the results of the two methods are in disagreement.

The frequency-based method determines the generality of a term by performing one or more simple tests based on document frequency, term frequency, or the TFIDF method. In general, a noun is more general if the corresponding frequency is higher.

The modifier method is based on the number of different modifiers before a given noun. Typically, the number of different modifiers for a general noun is greater than that of a specific noun. The specificity of a noun may be based on the following entropy:

$$H\text{mod}=-[P(\text{modifier}|\text{noun})*\log 2P(\text{modifier}|\text{noun})],$$

where P(modifier|noun) is the probability that a modifier is the rightmost modifier of the noun. Higher entropy typically indicates a more general noun.

The term pair evaluation unit 225 may also use a hypothesis tester which extracts sentence particles from the documents. A sentence particle includes nouns or noun phrases and a relationship between the nouns or noun phrases. The hypothesis tester generates queries in the form of sentence particles that are partially filled with terms. For example, in the query "biology and other," "biology" is a noun and "noun_A and other noun_B" is a pre-determined relationship, in which noun_A is more specific than noun_B. Other examples of the pre-determined relationships may include:
1. X is a (kind of/type of/sort of) Y,
2. X, Y and other Zs,
3. X is (a) part of Y,
4. X, especially Y (and Z),
5. X including Y (and Z), and
6. X such as Y (and/or Z),
where X, Y, Z are nouns or noun phrases.

In one scenario, the queries are sent to the search engine 105. When the search engine 105 finds a match between the queries and the sentence particles in the document abstract, the sentence particles are extracted. For example, the query "biology and other" matches "biology and other natural sciences". According to the pre-determined relationship, "natural sciences" or "sciences" is a more general term than "biology."

The term pair evaluation unit 225 may also use the Wordnet® to find a relationship between the terms in a term pair. The Wordnet® is a hand-built online thesaurus whose organization is modeled after the results of psycholinguistic research. A description of the Wordnet® may be found at Miller et al., "Introduction to Wordnet: An on-line lexical database," Journal of Lexicography, 3(4):235–244, 1990.

Another hypothesis tester may determine the relative specificity of the terms by the positions of the nouns in a noun compound (i.e., a noun-noun phrase). The term on the right in a term pair is usually more general than the term on the left. For example, in "cell biology," "biology" is a more general term than "cell".

Term pairs may also be evaluated by yet another hypothesis tester that searches for a noun compound on the basis that a relationship typically exists between two concurring nouns. However, the hypothesis tester may only evaluate whether two nouns fit together to form a compound. This hypothesis tester does not determine the relative specificity between the two nouns.

The term pair evaluation unit 225 uses the results generated by the hypothesis testers in the second subset to determine the relative specificity of the terms in a term pair. Each of the hypothesis testers generates two rank values for each term pair, one value for each term. Initially, the rank values of all the terms are zero. For each term pair a hypothesis tester indicates to fit together, the hypothesis tester adds one to the rank value of the more general term, and adds zero to the rank value of the more specific term. If the result of the hypothesis tester indicates that the terms fit together as a pair but is uncertain about the relative specificity of the terms, the hypothesis tester may add 0.5 to the rank values of both terms. If the result of the hypothesis tester indicates uncertainty about whether the terms fit together or decides the terms do not fit together at all, the hypothesis adds nothing to the rank values of both terms.

The term evaluation unit 225 subtracts the value of the second term from the value of the first term to generate a second aggregate ranking. If the second aggregate ranking is negative, the order of the terms in the term pair is reversed. The absolute value of the second aggregate ranking is compared with a pre-determined threshold. The term pair is kept only if the second aggregate ranking is above the threshold.

The term pair evaluation unit 225 creates a term hierarchy from all of the terms pairs whose second aggregate ranking is above the threshold. After the creation of the term hierarchy, the taxonomy optimization module 226 performs an optimization operation to remove the nodes of the term hierarchy that contain only marginal information. For example, the taxonomy optimization module 226 may delete the nodes with only one child. Moreover, if the term pairs (A,B), (A,C) and (B,C) all exist in the term hierarchy, (A,C) may be deleted.

Figure 3:
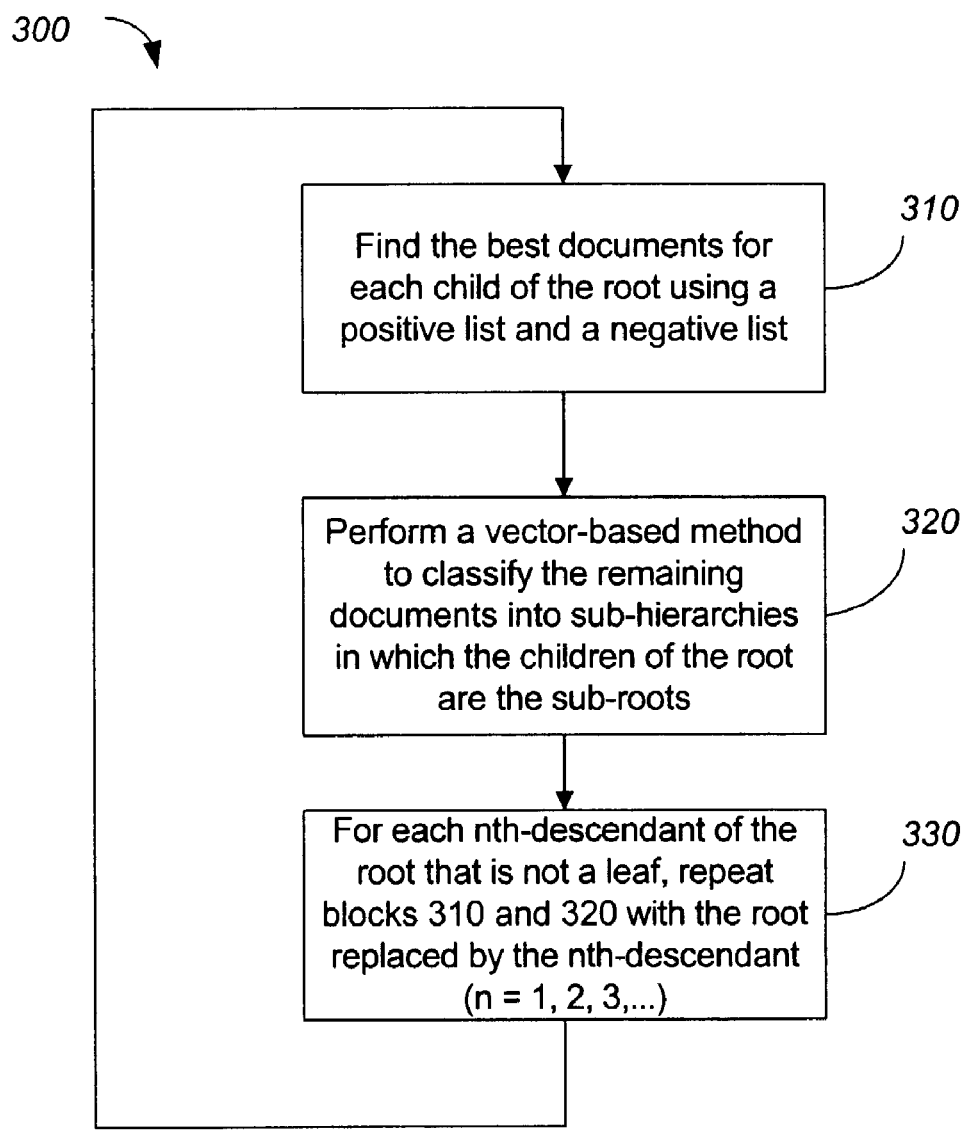
FIG. 3 shows a flowchart describing a recursive process used by the taxonomy generator to assign the documents into the term hierarchy.

Following the taxonomy optimization, the document assignment module 228 assigns documents to the term hierarchy using a combination of hierarchical and vector-based classification methods. The document assignment module 228 applies a recursive process 300, described in FIG. 3, that assigns the documents from the root of the term hierarchy to the leaves. The root of the term hierarchy is connected to a plurality of branches, each branch including a child of the root and all the descendants of the child. To determine which documents should be assigned to a child of the root, the document assignment module 228 creates a "positive-list" including all the terms in a given branch, and a "negative-list" including the terms in all the other branches. The document assignment module 228 then ranks the documents by the number of terms that a document has in the positive list and in the negative list. A document obtains a higher ranking if the document has more terms in the positive-list and fewer terms in the negative-list. The highest-ranking documents (e.g. five documents) are assigned to the child of the root in that given branch (block 310).

The document assignment module 228 repeats the document assignment for all the other children of the root. Following the assignments, the remaining documents are classified into one of the sub-hierarchies in which the children of the root are the sub-roots. One approach to this classification uses a vector-based classification method, e.g., the k-NN (the K-Nearest-Neighbor) classifier (block 320). If a document may be classified into more than one of the sub-hierarchies, the document remains in the root.

The process 300 repeats for every child of each sub-root. That is, for each nth-descendant (n=1, 2, 3, . . . ) of the root that is not a leaf, the process 300 repeats the operations in blocks 310 and 320 with the root replaced by the nth-descendant (block 330). The process 300 is repeated recursively until all the documents are assigned.

Figure 4:
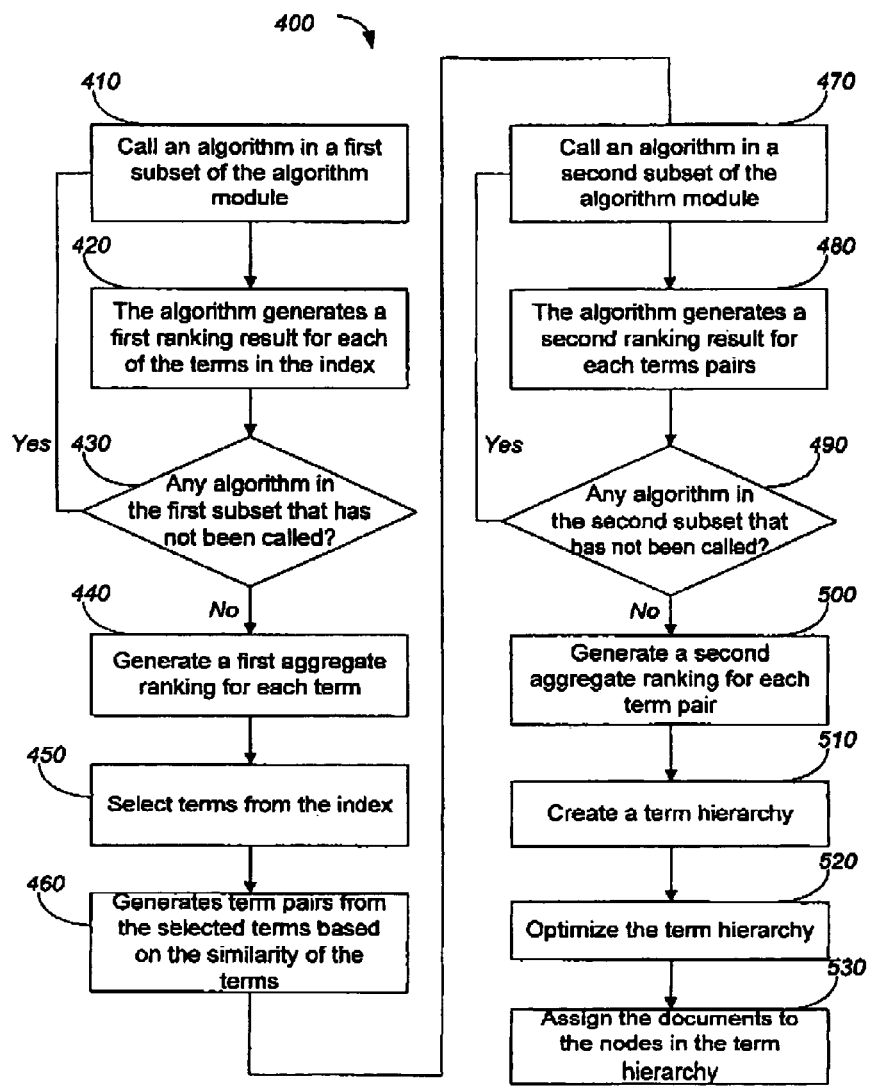
FIG. 4 shows a flowchart describing a taxonomy process used by the taxonomy generator to create a term hierarchy for document assignment.

FIG. 4 shows a flowchart describing a taxonomy generation operation 400 performed by the taxonomy generator 135. The term selection module 222 calls an algorithm in a first subset of the algorithm module 230 (block 410). The algorithm ranks each of the terms in the index 130 for relevance (block 420). The term selection module 222 proceeds to check if there is any algorithm in the first subset that has not been called (block 430). If there is any algorithm that has not been called, the term selection module 222 returns to block 410 to call the next algorithm in the first subset, which generates another ranking result for each of the terms in the index 130 (block 420). When all the algorithms in the first subset have been called, the term selection module 222 aggregates all of the ranking results produced by the first subset of algorithms to generate a first aggregate ranking for each of the terms in the index 130 (block 440). The first aggregate ranking is used to select terms from the index 130 (block 450).

Figure 5:
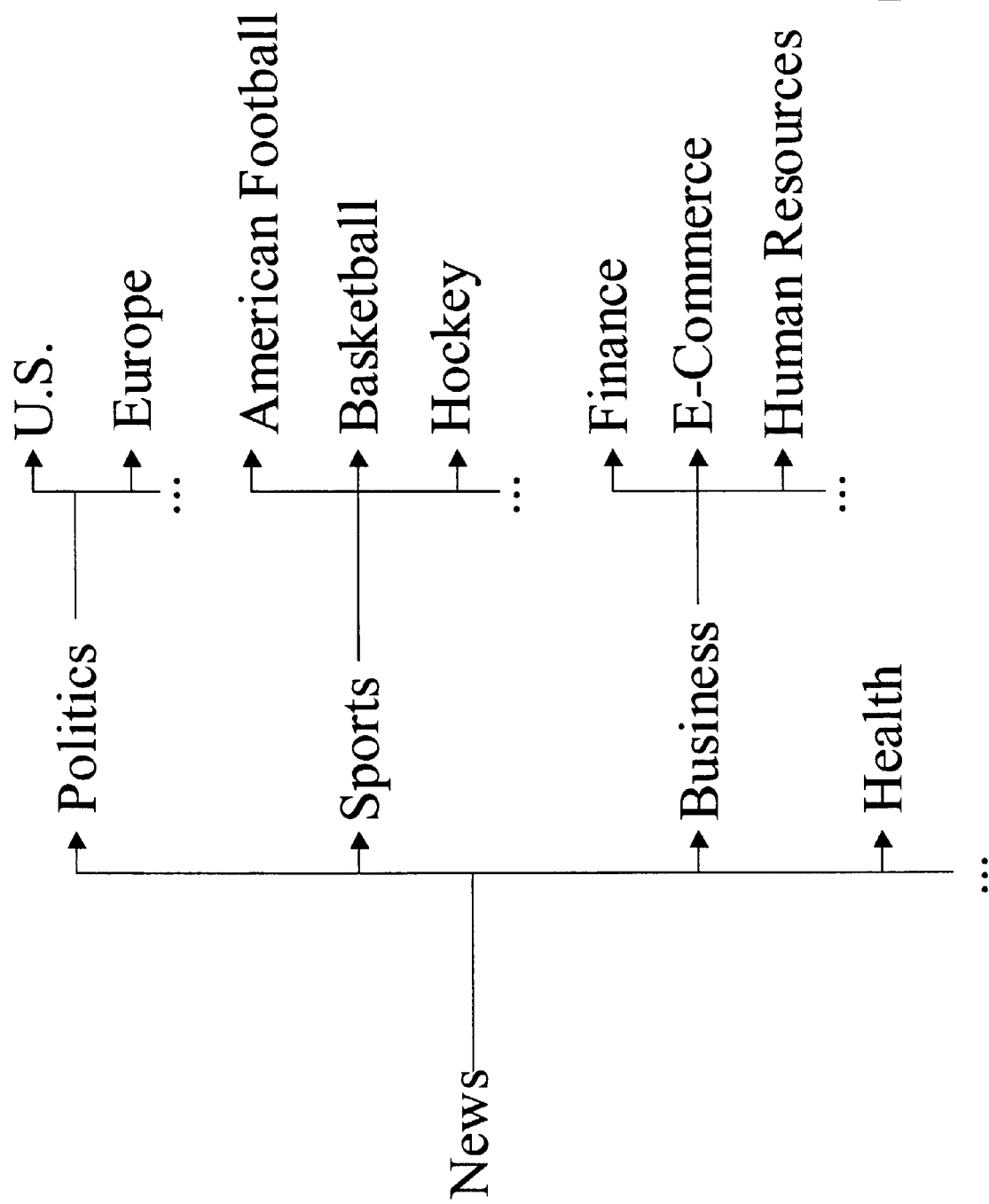
FIG. 5 shows one embodiment of a term hierarchy.

The term pair generation module 224 generates term pairs from the selected terms based on the similarity of the terms (block 460). The term pair generation module 224 calls an algorithm in a second subset of the algorithm module 230 to evaluate the relative specificity of the terms in the term pairs (block 470). The algorithm produces a second ranking result, including two rank values, for each of the term pairs (block 480). The term pair generation module 224 proceeds to check if there is any algorithm that has not been called in the second subset (block 490). If there is any algorithm that has not been called, the term pair generation module 224 returns to block 460 to call the next algorithm in the second subset. The next algorithm produces another ranking result for each of the term pairs (block 490). The operation 300 proceeds to block 400 when all the algorithms in the second subset have been called. The term pair generation module 224 then aggregates all the ranking results produced by the second subset of algorithms to generate a second aggregate ranking for each of the term pairs (block 500). The second aggregate ranking is used to create a term hierarchy (block 510), such as that shown in FIG. 5.

The taxonomy optimization module 226 optimizes the term hierarchy by removing the nodes that contain only marginal information (block 520). Finally, the document assignment module 228 assigns the documents to the nodes of the term hierarchy (block 530).

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although only a few embodiments have been described in detail above, other modifications are possible. For example, the logic flows depicted in FIGS. 3 and 4 do not require the particular order shown, or sequential order, to achieve desirable results. In certain implementations, multitasking and parallel processing may be preferable.

The invention claimed is:

1. A computer-implemented method comprising:
   extracting terms from a plurality of electronic documents;
   ranking the extracted terms using two or more term ranking algorithms;
   aggregating rankings of the ranked extracted terms to produce first aggregate rankings, each of the rankings resulting from one of the two or more ranking algorithms;
   selecting terms from the extracted terms, the selected terms having the first aggregate rankings above a pre-determined threshold;
   generating term pairs from the selected terms;
   ranking terms in each term pair based on a relative specificity of the selected terms using two more term pair ranking algorithms;
   aggregating the ranks of the terms in each term pair to produce second aggregate rankings, each of the ranks resulting from the two or more term pair ranking algorithms;
   selecting term pairs having the second aggregate rankings above a pre-determined threshold;
   generating a term hierarchy from the selected term pairs;
   assigning documents to nodes of the term hierarchy based on a number of terms within a branch of the term hierarchy associated with each node that match terms extracted from each document; and
   storing assignments of the documents to the nodes to a memory for retrieval of one or more documents responsive to a search query.

2. The method of claim 1, wherein the extracted terms are ranked based on frequency.

3. The method of claim 1, wherein the two or more term ranking algorithms include a TFIDF (Text Frequency and Inverse Document Frequency) algorithm.

4. The method of claim 1, wherein the two or more term ranking algorithms include a corpus based extraction algorithm.

5. The method of claim 1, further comprising:
   pre-selecting term pairs based on a similarity between the terms in each term pair.

6. The method of claim 5, further comprising:
   generating a vector formed by frequencies of terms in the term pairs for the documents; and
   determining a similarity between the terms in each term pair based on the vector.

7. The method of claim 1, wherein the two or more term pair ranking algorithms include a concept hierarchy algorithm.

8. The method of claim 1, wherein the two or more term pair ranking algorithms include a combination of a frequency-based method and a modifier method.

9. The method of claim 1, wherein the two or more term pair ranking algorithms include a sentence particle extraction algorithm.

10. The method of claim 1, wherein the two or more pair ranking algorithms include an algorithm that searches for compounded nouns.

11. The method of claim 1, further comprising optimizing the term hierarchy by removing one or more term pairs.

12. An article comprising a machine-readable medium storing instructions executed by one or more machines to perform operations comprising:
   extracting terms from a plurality of electronic documents;
   ranking the extracted terms using two or more term ranking algorithms;
   aggregating rankings of the ranked extracted terms to produce first aggregate rankings, each of the rankings resulting from one of the two or more ranking algorithms;
   selecting terms from the extracted terms, the selected terms having the first aggregate rankings above a pre-determined threshold;
   generating term pairs from the selected terms;

ranking terms in each term pair based on a relative specificity of the selected terms using two more term pair ranking algorithms;

aggregating the ranks of the terms in each term pair to produce second aggregate rankings, each of the ranks resulting from the two or more term pair ranking algorithms;

selecting term having the second aggregate rankings above a pre-determined threshold;

generating a term hierarchy from the selected term pairs; and storing assignments of the documents to the nodes to a memory for retrieval of one or more documents responsive to a search query.

13. The article of claim 12, wherein the extracted terms are ranked based on frequency.

14. The article of claim 12, wherein the two or more term ranking algorithms include at least one of a TFIDF (Text Frequency and Inverse Document Frequency) algorithm and a corpus based extraction algorithm.

15. The article of claim 12, wherein the operations further comprise:
pre-selecting term pairs based on a similarity between the terms in each term pair.

16. The article of claim 12, wherein the operations further comprise:
generating a vector formed by frequencies of terms in the term pairs for the documents; and
determining a similarity between the terms in each term pair based on the vector.

17. The article of claim 12, wherein the two or more term pair ranking algorithms are chosen from a group comprising: concept hierarchy algorithms, algorithms including a combination of a frequency-based method and a modifier method, sentence particle extraction algorithms, and algorithms that search for compounded nouns.

18. The article of claim 12, wherein the operations further comprise: optimizing the term hierarchy by removing one or more term pairs.

19. The article of claim 12, wherein the operations further comprise: assigning documents to nodes of the term hierarchy based on a number of teens within a branch of the term hierarchy associated with each node that match terms extracted from each document.

20. An apparatus comprising: a processor executing instructions to perform operations comprising:
ranking extracted terms using two or more term ranking algorithms, the extracted terms extracted from a plurality of electronic documents;

aggregating rankings of the ranked extracted terms to produce first aggregate rankings, each of the rankings resulting from one of the two or more ranking algorithms;

selecting terms from the extracted terms, the selected terms having the first aggregate rankings above a pre-determined threshold;

generating term pairs from the selected terms;

ranking terms in each term pair based on a relative specificity of the selected terms using two more term pair ranking algorithms;

aggregating the ranks of the terms in each term pair to produce second aggregate rankings, each of the ranks resulting from the two or more term pair ranking algorithms;

selecting term pairs having the second aggregate rankings above a pre-determined threshold;

generating a term hierarchy from the selected term pairs; and storing the term hierarchy to a memory for retrieval of one or more documents responsive to a search query.

21. The apparatus of claim 20, wherein the processor further performs operations comprising: assigning documents to nodes of the term hierarchy based on a number of terms within a branch of the term hierarchy associated with each node tat match terms extracted from each document.

22. The method of claim 1, wherein the term pairs are generated from terms having similar rankings in the first aggregate rankings.

23. The method of claim 1, wherein the extracted terms are extracted regardless of a pre-existing taxonomy, the term hierarchy is generated without a provided taxonomy, and the extracting occurs before the generating the term hierarchy.

24. The method of claim 1, further comprising:
presenting to a user a list of results to a search, the list of results comprising documents assigned to terms in the term hierarchy matching criteria of the search.

25. The method of claim 1, further comprising:
presenting to a user the results to a search, the results comprising documents assigned to terms in the term hierarchy matching criteria of the search and the results being organized in a hierarchy in accordance with the term hierarchy.

* * * * *